Aug. 18, 1925.

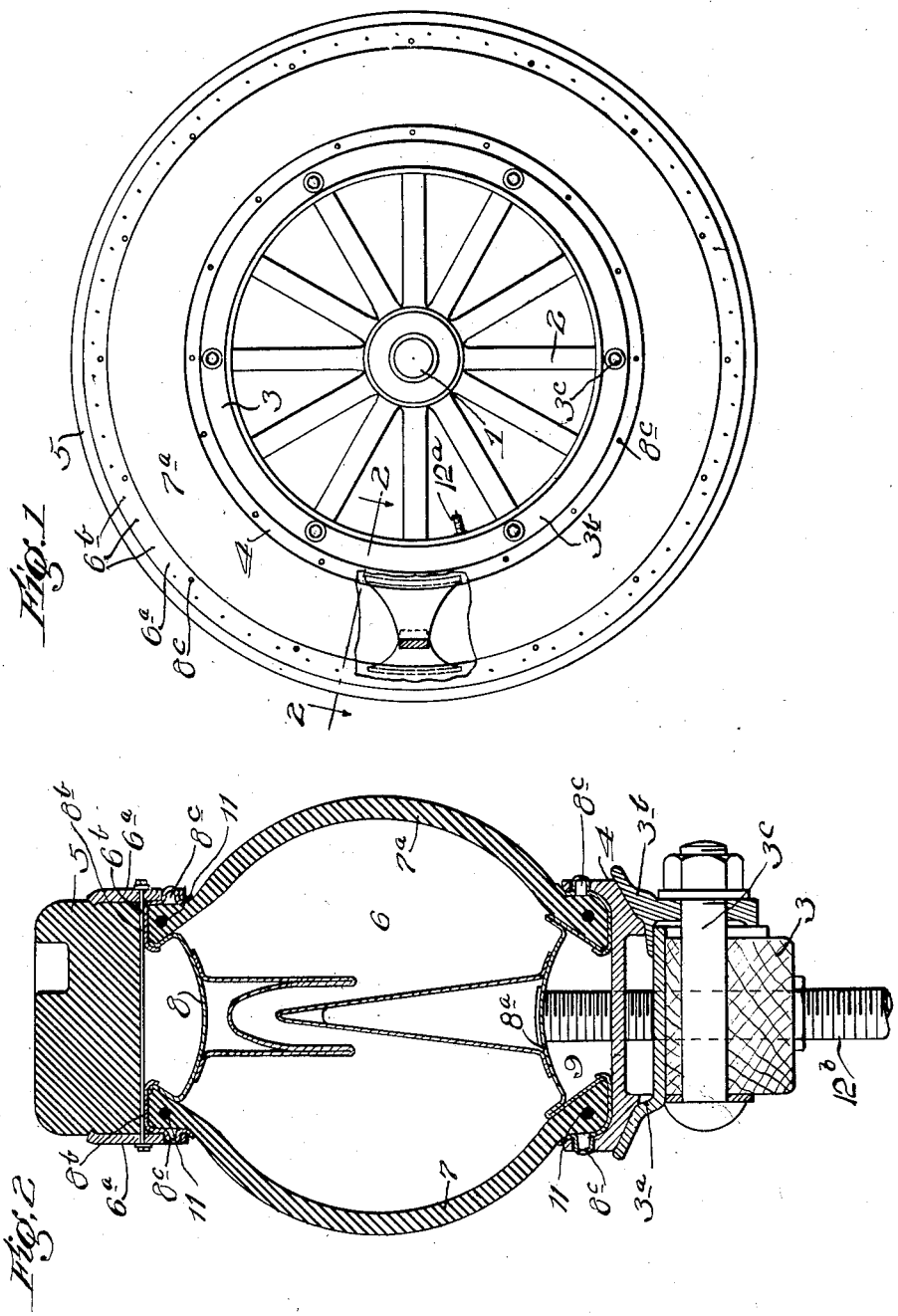

J. B. STRAUSS 1,550,289

WHEEL

Original Filed April 17, 1922    3 Sheets-Sheet 2

Inventor
Joseph B. Strauss
By Parker & Carter attys.

Aug. 18, 1925.  
J. B. STRAUSS  
WHEEL  
Original Filed April 17, 1922    3 Sheets-Sheet 3
1,550,289
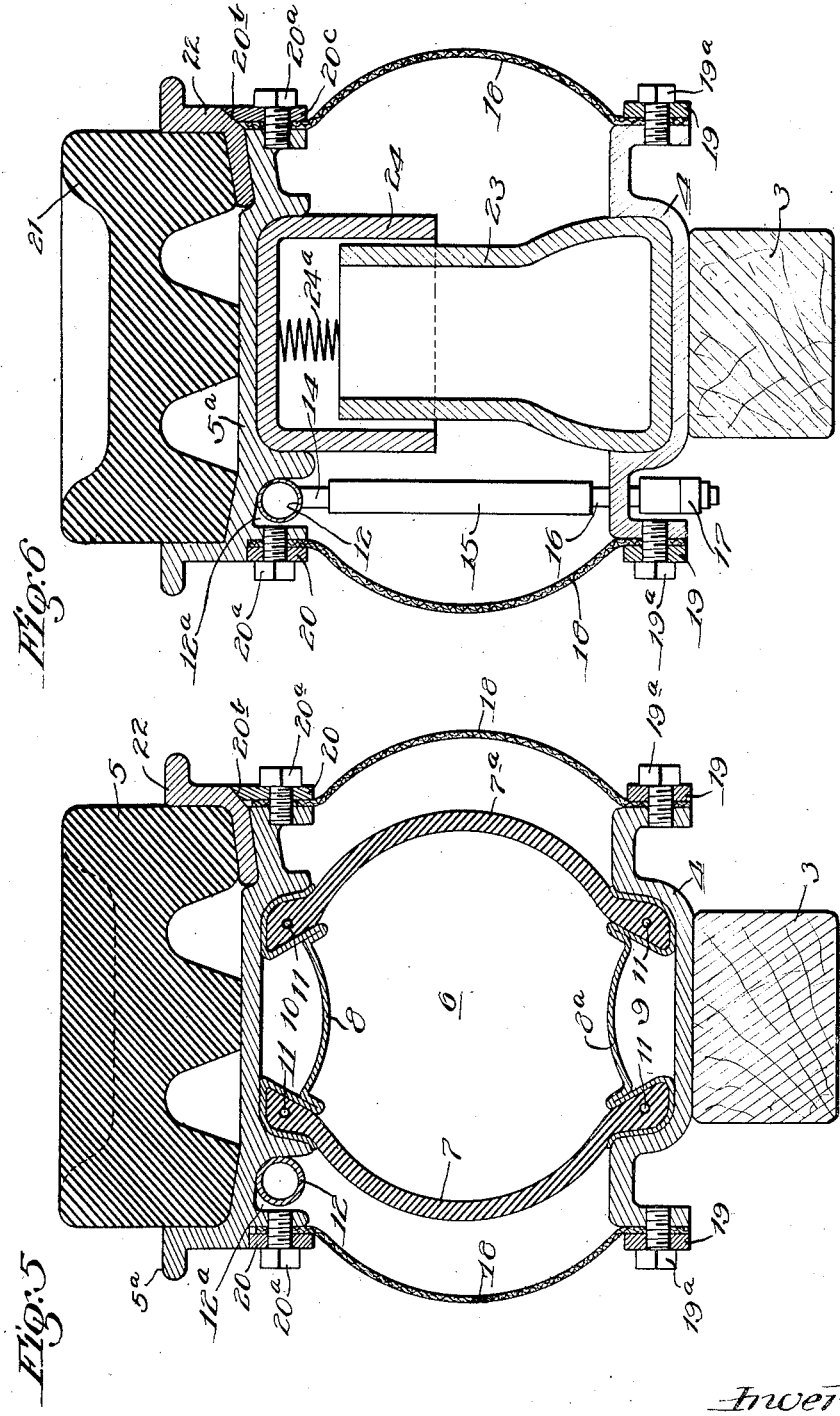

Patented Aug. 18, 1925.

1,550,289

UNITED STATES PATENT OFFICE.

JOSEPH B. STRAUSS, OF CHICAGO, ILLINOIS.

WHEEL.

Application filed April 17, 1922, Serial No. 553,493. Renewed December 16, 1924.

*To all whom it may concern:*

Be it known that I, JOSEPH B. STRAUSS, a citizen of the United States, residing at Chicago, in the county of Cook and State of Illinois, have invented a certain new and useful Improvement in Wheels, of which the following is a specification.

This invention relates to resilient tires for wheels and has for its object to provide a tire by means of which the cushioning effect of air is secured without danger of injuring the tire as is now present with the ordinary pneumatic tires used. Another object of the invention is to provide a tire which combines the advantages of the pneumatic and solid tires, which provides for local deformation and at the same time distributes the shock over the full air reservoir, which is easy riding, labor saving in respect to inflation and tire changing, practically permanent and at the same time reasonable in cost. The invention has other objects which are more fully pointed out in the description following.

Referring now to the accompanying drawings—

Fig. 1 is a view of one form of wheel embodying the invention;

Fig. 2 is a sectional view taken on line 2—2 of Fig. 1;

Fig. 5 is a sectional view taken on line 5—5 of Fig. 3;

Fig. 6 is a sectional view taken on line 6—6 of Fig. 3;

Like numerals refer to like parts throughout the several figures.

Figure 3:
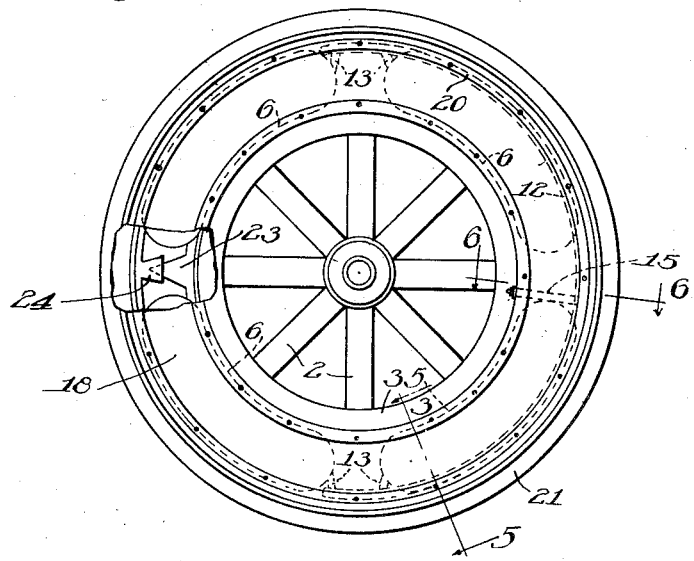
Fig. 3 is a view of a wheel with parts broken away embodying one form of the invention.

Referring now to the drawings I have illustrated a wheel having a hub 1, spokes 2, felly 3 and an inner section 4. There is an outer section 5 and between these two sections are located one or more air chambers 6.

Figure 4:
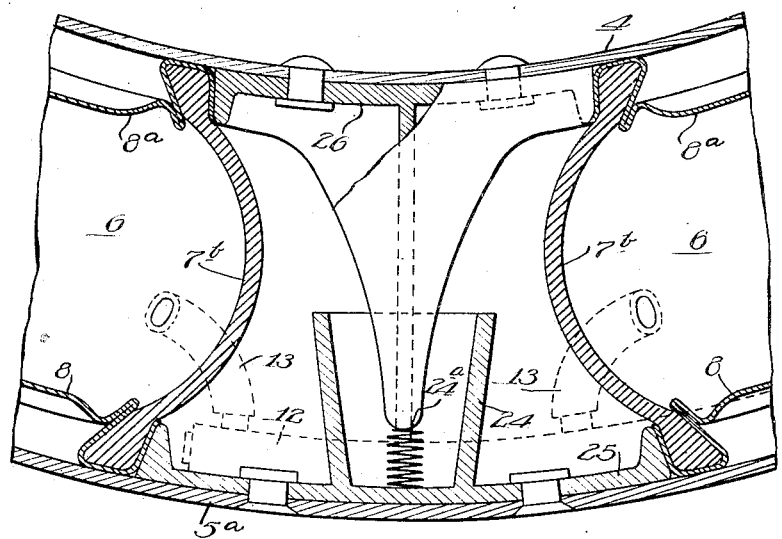
Fig. 4 is a sectional view showing the tire construction of Fig. 3.

In all the figures the outer section consists of the tread of the wheel and may be made of rubber. In Figs. 3 to 6 there is interposed within this outer section, a holding section 5ª. In Figs. 1 and 2 I have shown a construction with one air chamber, and in Figs. 3 and 4 I have shown a construction where more than one air chamber is used, this latter figure for purposes of illustration showing four of these air chambers. Each air chamber has non-metallic flexible or elastic side walls 7 and 7ª and metallic or rigid top and bottom walls 8 and 8ª. The section 4 is provided with a space 9 into which portions of the side walls 7 and 7ª project, and the section 5 is provided with some suitable means for holding the parts in proper relation. In the construction shown in Figs. 1 and 2 there are side pieces 6ª which are preferably of metal, and there are connecting devices 6ᵇ between them which are preferably rods with nuts so that the parts can be easily assembled. In the remaining figures the holding section 5ª is provided with a space 10 into which portions of the side walls 7 and 7ª also project. The top and bottom walls of the air chamber are shown as made of metal and are connected with the flexible walls which are preferably made of rubber so as to secure an air-tight structure that can be inflated and will hold the air so that it acts as a cushion. As herein shown the walls 8 and 8ª are bent around the edges of the flexible walls 7 and 7ª, the edges of said flexible walls being clinched or held between the bent edges of the walls 8 and 8ª. In other words, these walls 8 and 8ª are bent so as to form receiving grooves for the edges of the flexible walls 7 and 7ª. These flexible walls are preferably enlarged at their outer edges as illustrated so that there will be a clamping effect. I may also provide metallic members 11 in these enlarged portions as illustrated. When more than one air chamber is used in a wheel, such air chambers also have flexible ends 7ᵇ as illustrated in Fig. 4.

I prefer to make these walls all integral so that the construction is an elongated device with the top and bottom open, but the sides and ends integral, and where more than one is used in a wheel, the ends are also integral with the sides. I may make each of the metallic walls 8 and 8ª of a single piece of material bent into shape, but I prefer, however, to make them of separate pieces of material as shown in Fig. 1, as this is easier to construct and assemble. In this Fig. 1 it will be noted that the edges 8ᵇ of the metallic wall are made separate from the body portion and are connected thereto as by being brazed or otherwise fastened. I also prefer to provide the side pieces 6ª and inner section 4 with openings and to provide the pieces 8 and 8ª at intervals with projections 8ᶜ which fit into the openings in the pieces 6ª and 4, as shown in Fig. 2. This also helps to hold the parts in proper relative position.

The metal wall 8ª is formed in a similar manner to the metal wall 8. In the construction of Figs. 1 and 2 I have shown a demountable rim wherein the part 3 is provided with a metallic part 3ª into which the section 4 is received and in which it is removably held by the part or parts 3ᵇ, held in position by the bolt 3ᶜ. This permits the tire to be easily removed and replaced when desired. Some suitable means is provided for inflating these air chambers. In the construction of Figs. 1 and 2 this may be the ordinary means used for pneumatic tires, namely an air inlet 12ᵇ. As shown in Figs. 3 to 6 I provide a pipe 12 which extends partway around the wall. With the number of air chambers illustrated in Fig. 3 it is only necessary to have this pipe extend about halfway around. Connections 13 (see Figs. 3 and 4) extend from this pipe to the air chambers. At some suitable point the pipe has a branch 14 which is connected by a flexible connection 15 with a short pipe 16 containing any of the ordinary valves 17 through which air may be inserted to inflate the air chambers. The parts 14 and 16 are preferably rigid pipe, and the pipe 15 flexible so as to permit the two sections 4 and 5 to move relatively. I prefer to provide a protecting device for the air chambers. In Figs. 3 to 6 this result is secured by means of the flexible pieces 18 which extend around the wheel and which may be continuous or in sections. These flexible pieces may be of canvas or any other suitable material. They may even be of thin metal. They are fastened to the two sections in any desired manner. As herein shown there are annular pieces 19, 20 and 20ᶜ, which extend around the wheel and which are fastened to the sections by the fastening devices 19ª and 20ª. I have shown in Figs. 3 to 6 a particular construction. The section 5 is slid on laterally, there being a holding device 22 which is then put on and which is held in place by the annular piece 20ᶜ, said piece being beveled at 20ᵇ and engaging a bevel face on the holding piece 22 so that by simply removing the piece 20ᶜ, the outer tire may be easily and quickly removed. During the ordinary operation of the device the stresses are transmitted from the outer section through the air chambers to the inner section just the same as with a pneumatic tire. In order, however, to take up excessive strains whenever they occur, I prefer to provide a series of interlocking parts or projections 23 and 24, one being hollow, the one fitting into the other loosely as illustrated in Figs. 3, 4 and 5. This takes care of any excessive lateral strains or any excessive torsional strains, for when any such excessive strains occur, the sections move relatively until the projections engage each other. These interlocking parts 23 and 24 may be arranged in any desired manner. In the construction of Figs. 1 and 2 these interlocking projections are attached to the metal pieces 8 and 8ª in any desired manner, as for example by being brazed thereto. When a series of air chambers are used these projections may be placed upon bases 25 and 26 which bases are fastened by suitable fastening devices to the parts 4 and 5ª (see Fig. 4). The sections, it will be noted, form as it were separated load carrying members, and they are connected together so as to permit relative movement, the air chamber or chambers being located intermediate these load carrying members. When the air chamber or chambers are inflated by inserting air, the pressure of the air on the walls 8 and 8ª tend to hold and keep the edges of the flexible members 7 and 7ª in their proper position. When now the wheel is in operation it will be seen that this air in these air chambers act as air cushions in a similar manner to the air cushion in the pneumatic tire. It will further be seen that the air chambers are protected from puncture or injury and hence do not wear out as is the case with pneumatic tires, the structure producing a wheel which has the advantages of a pneumatic tire without its disadvantages, thus forming a practical, cheap, efficient, resilient construction. The air pipe 12 is preferably located in a groove 12ª in the outer section 5ª.

Where a plurality of these air chambers are used, if any one of them becomes defective it can be taken out without disturbing any of the others by simply removing the parts 20ᶜ and 22 and replaced by a new air chamber. When there are a plurality of these air chambers they may all be inflated from the same source, as for example the pipe 12.

I have shown the device used in connection with wheels, but it is of course evident that it may be used in various other places where there are load carrying members to be elastically connected together, such as springs and the like.

The pressure of the air in the chamber tends to seal the joints between the metal walls and the flexible walls as it exerts a pressure which tends to force the portions of the walls enclosing the edges of the flexible members toward each other.

I may provide an elastic device 24ª between the interlocking parts 23 and 24 so that as the part 23 approaches the bottom of the part 24 it will meet an elastic resistance so as to prevent undue shock.

I have described in detail a particular construction embodying the invention but it is of course evident that the parts may be varied in many particulars without departing from the spirit of the invention as embodied in the claims hereto appended, and I therefore do not limit myself to the particular construction shown.

It will be noted that the resilient device is so constructed that the pressure of the air on the interior thereof acts to increase the sealing effect between the top and bottom walls and the side walls.

I claim:

1. A wheel comprising an inner section and an outer section, an air chamber separate from both of said sections and located between them comprising non-metallic side walls, and metallic top and bottom walls, the metallic walls being connected to the side walls so as to form a sealed chamber.

2. A wheel comprising an inner section and an outer section, an air chamber separate from both of said sections and located between them comprising flexible side walls and metallic top and bottom walls, the metallic walls being connected to the side walls so as to form a sealed chamber, and flexible protecting devices outside of said air chamber comprising flexible members connected with the outer and inner sections.

3. A wheel comprising an outer rim section, and an inner rim section, an air chamber separate from both of said rim sections and located between them comprising non-metallic walls, and metallic walls connecting said nonmetallic walls, the points where the metallic walls connect with the nonmetallic walls forming sealed joints.

4. A wheel comprising an outer rim section, an inner rim section, a plurality of separated air chambers separate from both of said rim sections and located between them, said air chambers each comprising flexible walls, metallic walls connecting said flexible walls, the connection between the metallic walls and flexible walls forming sealed joints, and means for inflating said air chambers.

5. A wheel comprising an outer rim section, an inner rim section, a plurality of separated air chambers separate from both of said rim sections and located between them, said air chambers each comprising flexible walls, metallic walls connecting said flexible walls, the connection between the metallic walls and flexible walls forming sealed joints, and means for inflating said air chambers, flexible pieces on the outside of said air chambers and removably connected with said inner and outer rim sections.

6. A wheel comprising an outer rim section, an inner rim section, a plurality of separated air chambers between them, said air chambers each comprising flexible walls, metallic walls connecting said flexible walls, the connection between the metallic walls and flexible walls forming sealed joints, and means for inflating said air chambers, flexible pieces on the outside of said air chambers and removably connected with said inner and outer rim sections, said means for inflating the air chambers comprising a conduit located between the air chamber and said outer flexible pieces and connections between said conduit and said air chambers.

7. A wheel comprising outer and inner rim sections, a plurality of air chambers separate from both of said rim sections and located between them each comprising flexible walls and metallic walls connecting said flexible walls, connections between the flexible walls and the metallic walls being sealed connections so as to form an air tight chamber, an outer elastic tire connected with the outer rim section, a holding piece for said tire, protecting devices for said air chambers at each side thereof extending around said wheel, said protecting devices removably connected to the rim sections so that they may be removed to secure access to the air chambers.

8. A wheel comprising outer and inner rim sections, a plurality of air chambers separate from both of said rim sections and located between them each comprising flexible walls and metallic walls connecting said flexible walls, connections between the flexible walls and the metallic walls being sealed connections so as to form an air tight chamber, an outer elastic tire connected with the outer rim section, a holding piece for said tire, protecting devices for said air chambers at each side thereof extending around said wheel, said protecting devices removably connected to the rim sections so that they may be removed to secure access to the air chambers, the fastening device for one of said protecting devices acting to hold said holding piece for the elastic tire in position.

9. A wheel comprising outer and inner rim sections having opposed annular recesses, a plurality of air chambers separate from both of said rim sections and located between said rim sections, each made up of flexible walls, and metallic walls connecting said flexible walls, said metallic walls having portions bent back upon themselves to receive the edges of the flexible walls, said bent portions pressed towards each other to form sealed joints, the edges of said flexible wall being received in said annular recesses in said rims.

10. A resilient device comprising separated load carrying members connected together so as to permit relative movement, a removable air chamber between them and separate from said load carrying members, said air chamber having two yielding walls and two stiff walls connecting said yielding walls, the points of connection forming sealed joints so as to secure a sealed air chamber.

11. A resilient device comprising a separate self contained air chamber having non-metallic flexible walls with metallic walls connecting said flexible walls the connection between said metallic walls and flexible walls forming sealed connections so as to form a sealed air chamber.

12. A resilient device comprising a separate self contained air chamber having two flexible side walls, metallic top and bottom walls, sealed connections between said side walls and top and bottom walls so as to form a sealed air chamber.

13. A separate self contained resilient device comprising side flexible walls, top and bottom metallic walls, said metallic walls having portions thereof bent back upon themselves to form grooves, the edges of the flexible walls being received in said grooves, the bent portions of the metallic walls being forced toward each other to form sealed connections.

14. A wheel comprising outer and inner rim sections, a plurality of air chambers separate from both of said rim sections and located between them, each comprising flexible walls and metal walls connecting said flexible walls, the connection between the metal walls and flexible walls being a sealed connection, and projecting parts on said inner and outer rim sections, one of the parts loosely projecting into the other so as to limit the relative movement of the sections.

15. A wheel comprising outer and inner rim sections, a plurality of air chambers separate from both of said rim sections and located between them, each comprising flexible walls and metal walls connecting said flexible walls, the connection between the metal walls and flexible walls being a sealed connection, and projecting parts on said inner and outer rim sections, one of the parts loosely projecting into the other so as to limit the relative movement of the sections, and an elastic device interposed between said projecting parts.

16. A separate self contained resilient device comprising side flexible walls and top and bottom metallic walls, said metallic walls having portions thereof bent back upon themselves to form grooves, the edges of the flexible walls being received in said grooves, load carrying members between which said air chamber is located and having recesses into which the portions of the metallic members which are bent back upon themselves are received, the outer portions thereof engaging the walls of said recess, the pressure of the air on the interior walls tending to seal the connection between the metallic members and the flexible members.

17. A resilient device comprising a removable unitary air chamber having two flexible walls, and stiff top and bottom walls, sealed connections between said side walls and top and bottom walls, so as to form a sealed air chamber.

18. A resilient device comprising a removable air chamber having two flexible walls, and pressure transmitting top and bottom walls, sealed connections between said side walls and top and bottom walls, so as to form a sealed air chamber.

19. A resilient device comprising a unitary air chamber having two flexible walls, and stiff top and bottom walls, sealed connections between said side walls and top and bottom walls, so as to form a sealed air chamber, the top and bottom walls acting to increase the sealing effect under pressure.

20. A resilient device comprising an air chamber having two flexible walls and stiff top and bottom walls, the several walls being constructed so that the pressure of the air inside of the resilient device acts to increase the sealing effect between the top and bottom walls and the side walls.

21. A tire for wheels comprising two separate flexible side walls, inner and outer sealing connecting walls having convex curved opposed faces extending across the space between the side walls.

22. A tire for wheels comprising two separate flexible side walls having oppositely inclined inner opposed faces at the top and bottom and top and bottom sealing connecting walls having inclined faces which engage said inclined faces on the said side walls.

23. A tire for wheels comprising two separate flexible side walls having enlarged top and bottom edges sealing connecting devices connecting said enlarged top and bottom edges one of said sealing connecting devices consisting of a piece of material which engages the inner and outer faces of said side walls.

24. A wheel having a channel shaped rim part a removable tire removable as a unit comprising two separate flexible side walls and a stiff top connecting and sealing wall and an expanding device at the bottom for forcing the said side walls against the edge of the channel to seal the side walls and hold them in place without bolts.

25. A wheel having a channel shaped rim part a removable tire removable as a unit comprising two separate flexible side walls and a stiff top connecting and sealing wall and an expanding device at the bottom for forcing the said side walls against the edge of the channel to seal the side walls and hold them in place without bolts, the pressure of the air in the tire when inflated increasing the action of the expanding device and the sealing effect thereof.

Signed at Chicago, county of Cook and State of Illinois, this 14th day of April, 1922.

JOSEPH B. STRAUSS.